(No Model.)
W. HAYES, Jr.
MECHANISM FOR PREVENTING THE LAPPING OF BELTS ON SHAFTING.
No. 272,687. Patented Feb. 20, 1883.
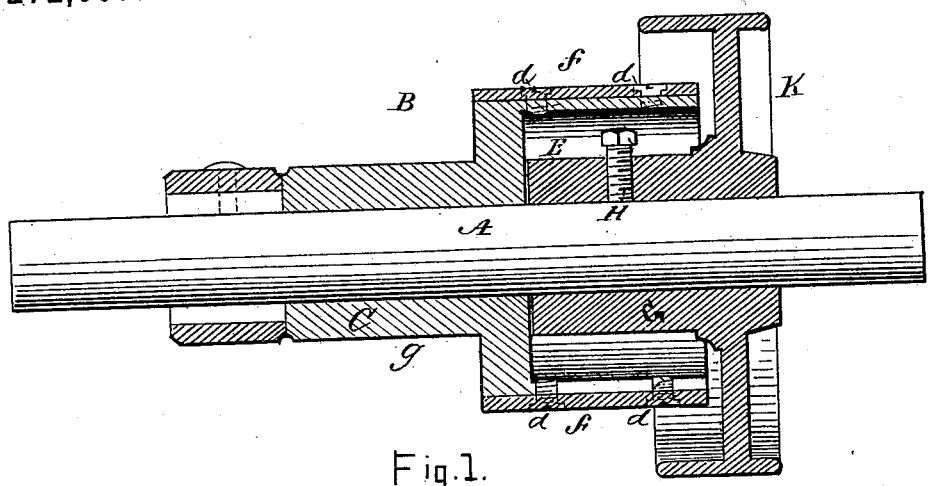
Fig. 1.
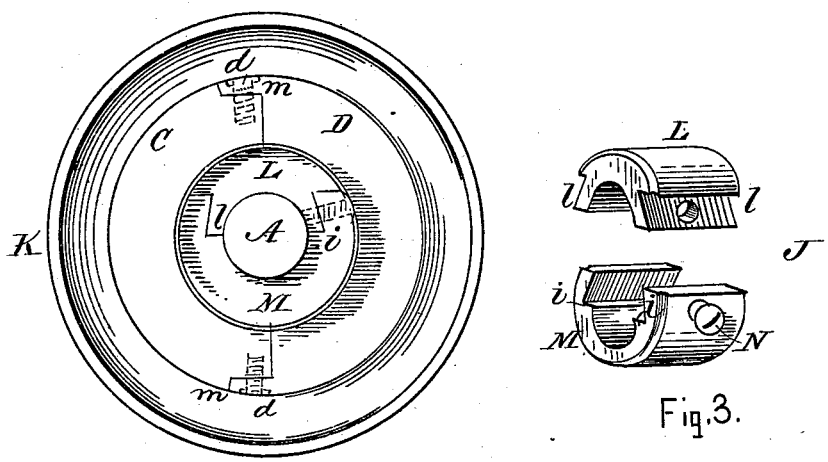
Fig. 2.
Fig. 3.
Witnesses:
H. E. Metcalf
C. H. Appleton
Inventor
William Hayes Jr.
Per C. A. Shaw
Atty.

UNITED STATES PATENT OFFICE.

WILLIAM HAYES, JR., OF FALL RIVER, MASSACHUSETTS, ASSIGNOR TO HIMSELF, AND SAMUEL D. HOWLAND, OF SAME PLACE, AND CHARLES E. COOK, OF DARTMOUTH, AND ABBOTT P. SMITH, OF NEW BEDFORD, MASS.

MECHANISM FOR PREVENTING THE LAPPING OF BELTS ON SHAFTING.

SPECIFICATION forming part of Letters Patent No. 272,687, dated February 20, 1883.

Application filed January 2, 1883. (No model.)

*To all whom it may concern:*

Be it known that I, WILLIAM HAYES, Jr., of Fall River, in the county of Bristol, State of Massachusetts, have invented a certain new and useful Improvement in Mechanism for Preventing the Lapping of Belts on Shafting, of which the following is a description sufficiently full, clear, and exact to enable any person skilled in the art or science to which said invention appertains to make and use the same, reference being had to the accompanying drawings, forming a part of this specification, in which—

Figure 1 is a vertical longitudinal section, showing a shaft provided with my improvement; Fig. 2, an end elevation; and Fig. 3, an isometrical perspective view, showing the construction of the collet.

My invention is designed as an improvement on the mechanism for a similar purpose secured to William Hayes by Letters Patent No. 62,746, dated March 12, 1867; and it consists in a novel construction and arrangement of the parts, as hereinafter more fully set forth and claimed, by which a more effective device of this character is produced than is now in ordinary use.

In the device of said Hayes, as described in said Letters Patent, no means was provided for covering the hub and attaching-screw of the pulley, or of confining the sleeve satisfactorily in any desired position on the shaft.

My invention is designed to obviate these objections, and to that end I make use of means which will be readily understood by all conversant with such matters from the following explanation, the extreme simplicity of the improvement rendering an elaborate description unnecessary.

In the drawings, A represents the shaft, and B the sleeve. The sleeve is constructed in two sections or halves, C D, to enable the same to be applied to shafting already erected, the sections being rabbeted or overlapped, as shown at *m m*, and connected by the screws *d d*. The inner end of the sleeve, or that next the pulley K, is enlarged to form the chamber E for receiving and covering the hub G and attaching screw H of the pulley K, the outer surface, *f*, of the chamber or enlarged portion being in parallelism with the outer surface, *g*, of the body of the sleeve. A clutch-collet, J, is employed to keep the sleeve in a proper position on the shaft with respect to the pulley, this collet being formed in two parts or sections, L M, the section M being provided with the rabbets *i i* and the section L with corresponding dovetails, *l l*, the two parts being united on the shaft by slipping the part L into the part M, after which they are locked together by the screw N, which passes through both sections into contact with the shaft, thereby serving the double purpose of securing the collet to the shaft and keeping its two parts or sections properly interlocked.

It will be understood that the shaft-hole through the sleeve is of a proper size to permit the sleeve to revolve freely on the shaft when the belt is accidentally thrown from the pulley onto the sleeve; also, that the body of the sleeve and its enlarged portion may be constructed of any desired length or size, or in accordance with the requirements of the circumstances under which it is used; also, that the sleeve may be cast whole and placed on the shafting before it is put up, if desired.

Having thus explained my invention, what I claim is—

1. The sleeve B, consisting of the two sections C D, united by the screws *d*, and provided with the chamber E for receiving the hub of the pulley K, in combination with the shaft A and a retaining-collet, substantially as set forth.

2. The improved clutch-collet described, the same consisting of the sections L M, dovetailed together and adapted to be secured to a shaft by the screw N, substantially as specified.

3. In a device for preventing belts from lapping on shafting, the collet J, constructed as described, a loose sleeve for receiving the unshipped belt, a shaft on which the sleeve and collet are mounted, and a pulley, all combined and arranged to operate substantially as set forth.

4. In a device for preventing the lapping of belts on shafting, the sleeve B, consisting of the two sections C D, united by the screws d, and provided with the chamber E, the collet J, consisting of the two sections L M, dovetailed together, and provided with the screw N, the shaft A, and pulley K, all constructed, combined, and arranged to operate substantially as specified.

WILLIAM HAYES, JR.

Witnesses:
H. E. METCALF,
HENRY H. EARL.